UNITED STATES PATENT OFFICE.

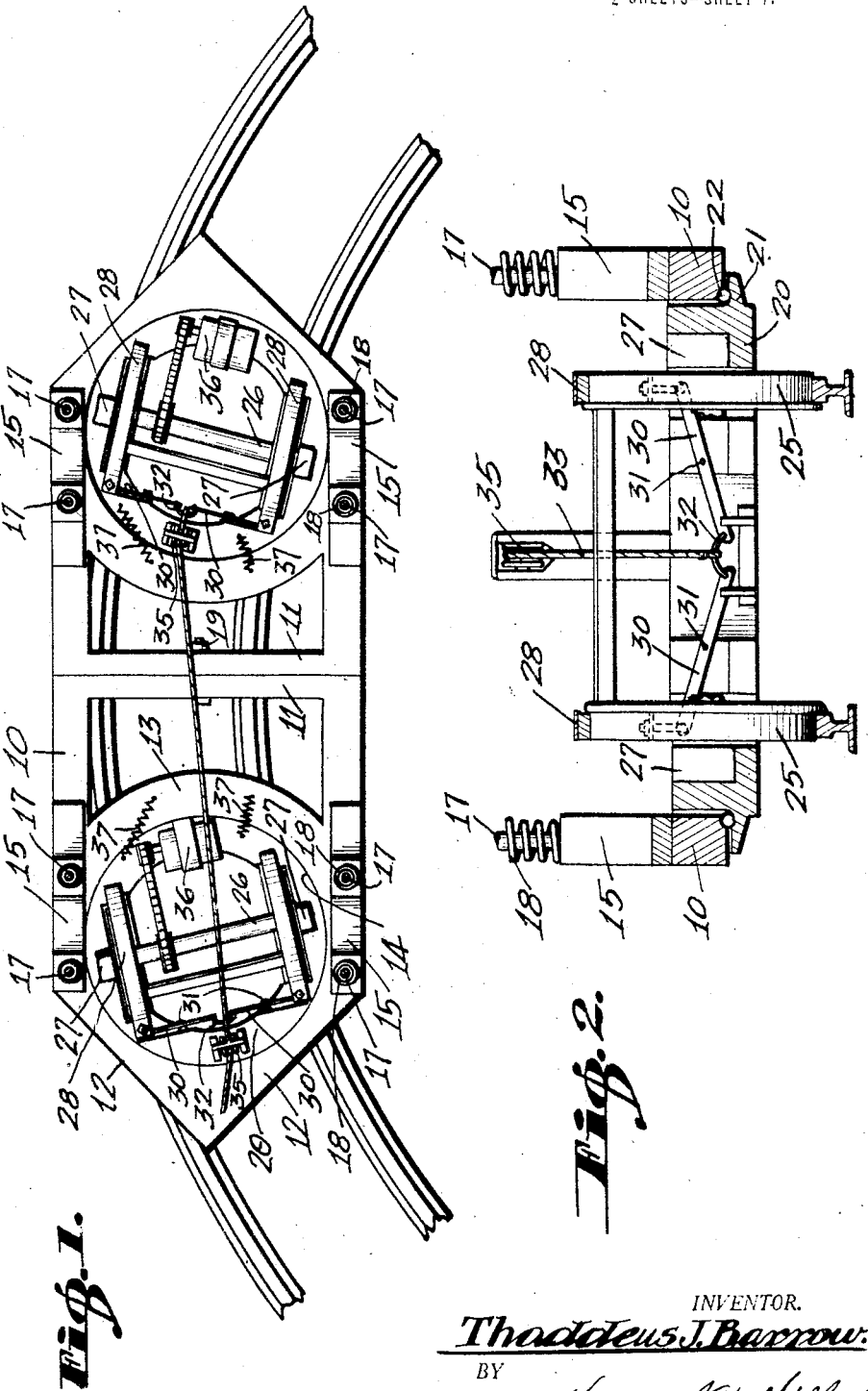

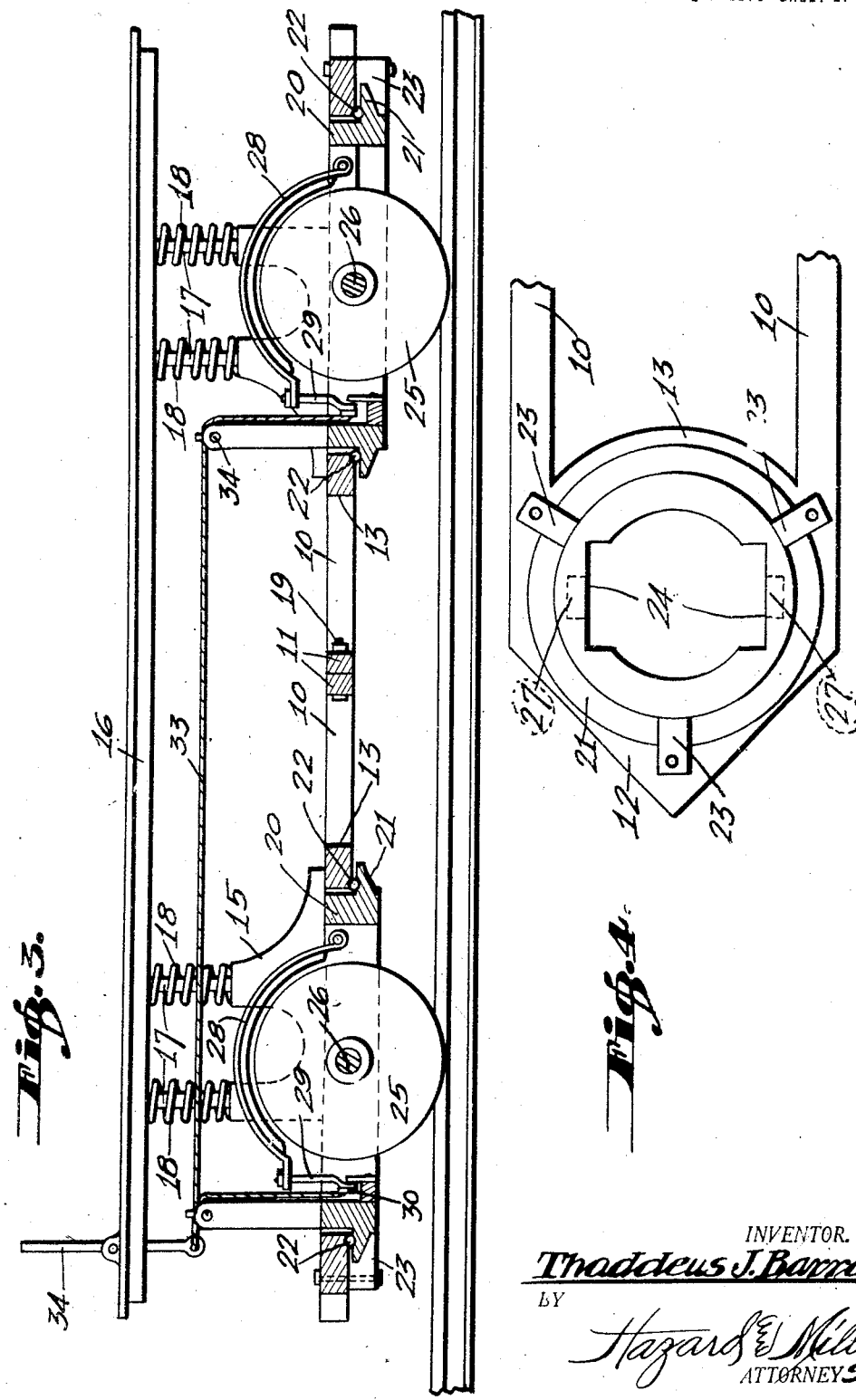

THADDEUS J. BARROW, OF RIVERSIDE, CALIFORNIA.

STREET-CAR TRUCK.

1,412,383. Specification of Letters Patent. Patented Apr. 11, 1922.

Application filed June 20, 1921. Serial No. 478,999.

*To all whom it may concern:*

Be it known that I, THADDEUS J. BARROW, a citizen of the United States, residing at Riverside, in the county of Riverside and State of California, have invented new and useful Improvements in Street-Car Trucks, of which the following is a specification.

My invention relates generally to car trucks and more particularly to trucks for street cars, the principal objects of my invention being to generally improve upon and simplify the construction of the existing types of street car trucks; to provide a car truck having great strength and durability; to provide a car truck wherein the wheel carrying axles are mounted upon horizontally disposed rotatably arranged members, thereby permitting the wheel carrying axles to swing freely in a horizontal plane and consequently enabling the truck to traverse relatively short curves; to combine with the truck relatively simple and effective brake mechanism that will operate positively regardless of the positions of the wheels; to provide a truck construction that is capable of being easily assembled or taken apart; and further, to provide a truck that can be easily and cheaply produced, and which will be very effective in performing its intended functions.

With the foregoing and other objects in view, my invention consists in certain novel features of construction and arrangement of parts that will be hereinafter more fully described and claimed, and illustrated in the accompanying drawings, in which:

Figure 1 is a top plan view of a car truck of my improved construction and showing the same in position upon a curved portion of a track.

Fig. 2 is an enlarged cross section taken approximately on the line 2—2 of Fig. 1.

Fig. 3 is a longitudinal section taken approximately on the line 3—3 of Fig. 1.

Fig. 4 is a view looking against the under side of the rotatably mounted frame or turntable that carries the axle and wheels of the truck.

In the construction of my improved truck the main frame is preferably constructed in two parts, each of which may be formed in a single piece by casting, or it may be of fabricated structure. Each main frame member comprises a pair of side rails 10, a transversely disposed inner end rail 11 and a pair of inclined outer end rails 12 that converge and are united at the medial line of the truck, thereby providing a completed truck frame with pointed ends.

Arranged between the side rails 10 and at an intermediate point between the end rails 11 and 12 is a transversely disposed curved rail 13, and the curved inner edge thereof unites with the curved inner edges of the outer end rails 12 in forming a circular opening 14 in each member of the truck frame body, and which circular opening is occupied by the rotating member that serves as a supporting frame for the wheel carrying axle. Secured in any suitable manner on top of the side rails 10, and preferably at points to the sides of the circular openings 14, are blocks 15, and projecting upwardly from each block and extending through suitable openings formed in the base frame 16 of the supported car body is a pair of pins or rods 17, and positioned upon each pin and interposed between the block and the under frame of the car body is an expansive coil spring 18.

By virtue of the construction thus described the car body is yieldingly supported upon the car truck and all shocks and vibrations resulting from the passage of the truck wheels over rough portions of the track are absorbed by the springs 18. The two parts of the truck frame are rigidly secured to each other in any suitable manner, preferably by means of bolts 19 that pass through the transversely disposed inner end rails 11.

Arranged to rotate freely in each circular opening 17 is a ring-shaped frame or turntable 20 having on its lower portion a horizontally disposed, outwardly projecting flange 21 that occupies a position beneath the parts 12 and 13 of the frame, and interposed between said flange and the frame parts 12 and 13 are anti-friction members 22 which may be either balls or rollers. Secured in any suitable manner to the under sides of the frame members 12 and 13 are retaining blocks 23, the inner ends of which underlie the flange 21 and thus the ring-shaped frame or turntable 20 is held to rotate freely within the opening 14.

Formed in the inner edge of each ring or turnable 20 and at oppositely disposed points thereupon are openings 24 which accommodate the wheels 25 of the truck, said wheels being fixed in the usual manner upon an axle 26, and the end portions of the latter being mounted in suitable journal boxes 27, and which latter are arranged on the ring frame or turntable 20 at points outside the central portions of the wheel openings 24. Arranged above the tread portion of each wheel is an arcuate brake shoe 28, the same being pivotally connected at one end to the ring-shaped frame or turntable, and the opposite end of each brake shoe is connected by means of a short vertically disposed link 29 to the upper end of transversely disposed lever 30, and which latter is fulcrumed near its inner end to a bracket 31 that is secured to the ring-shaped frame or turntable 20. The inner ends of the members of each pair of levers 30 are connected by a short link 32, and the links for the two pairs of levers are connected by flexible members such as chains or cables 33 to a brake lever 34 that is mounted on the car body adjacent to the driver's seat, and said flexible member 33 passing over suitably located pulleys 35.

Where my improved car trucks are utilized on cars that are electrically driven suitable electric motors such as 36 are mounted on the ring frames or turntables 20 and the shafts of said motors having suitable driving connections, either sprocket chains or gearing, with the wheel carrying axles 26. Relatively heavy retractile coil springs 37 are secured at one end to the transversely disposed curved members 13 of the truck frame and at their opposite ends to the ring frames or turntables 20, said springs yieldingly retaining the turntables against rotary movement in either direction and restoring said turntables to their normal positions after they have rotated in one direction or the other, as a result of the passage of the truck around a curved portion of the track.

Thus it will be seen that I have produced a relatively simple, strong and durable truck that is particularly applicable for use in supporting the bodies of street cars and the like, and the wheel carrying axles of said truck being mounted so that they can readily swing in either direction as the truck traverses curved portions of the track, and that all of the truck wheels are provided with simple and efficient braking means which, when set by manipulation of the lever 32, will directly engage the tread portions of the car wheels and retard the rotation thereof.

The construction of the truck in two main parts greatly facilitates manufacture, assembly, repairs and adjustments, and if either wheel carrying axle or turntable becomes broken or unfit for service it can be readily removed and replaced with a new part without necessitating the dismantling of the entire truck structure.

It will be readily understood that minor changes in the size, form and construction of the various parts of my improved street car truck may be made and substituted for those herein shown and described without departing from the spirit of the invention, the scope of which is set forth in the appended claims.

I claim:

1. In a car truck, a frame formed in two parts, each part being provided with a circular opening, a ring frame arranged for rotation in the opening in each part of the frame, wheel-carrying axles journaled in each ring frame, and anti-friction members between each ring frame and part of the brake frame with which it is associated.

2. In a car truck, a frame formed in two parts, each part being provided with a circular opening, a ring frame arranged for rotation in the opening in each part of the frame, wheel-carrying axles journaled in each ring frame, anti-friction members between each ring frame and part of the brake frame with which it is associated, and wheel-engaging brakes mounted on each ring frame.

3. The combination with a car truck frame having circular openings near its ends, of ring frames arranged for rotation in said openings, anti-friction bearings between said ring frames and the truck frame, a wheel-carrying axle journaled on each ring frame, and yielding resistance means for restraining the ring-shaped frames against rotation.

4. The combination with a car truck frame having circular openings near its ends, of ring frames arranged for rotation in said openings, anti-friction bearings between said ring frames and the truck frame, a wheel-carrying axle journaled on each ring frame, yielding resistance means for restraining the ring-shaped frames against rotation, and braking means carried by the ring-shaped frames and adapted to engage the truck wheels.

In testimony whereof I have signed my name to this specification.

THADDEUS J. BARROW.